United States Patent
Mahiat et al.

(10) Patent No.: US 7,851,037 B2
(45) Date of Patent: Dec. 14, 2010

(54) ACETALDEHYDE SCAVENGER IN POLYESTER ARTICLES

(75) Inventors: Bernard Mahiat, Wanze (BE); Jerome Waeler, Saint Martin le Noeud (FR)

(73) Assignee: PolyOne Corporation, Avon Lake, OH (US)

( * ) Notice: Subject to any disclaimer, the term of this patent is extended or adjusted under 35 U.S.C. 154(b) by 686 days.

(21) Appl. No.: 11/815,644

(22) PCT Filed: Feb. 6, 2006

(86) PCT No.: PCT/US2006/004241

§ 371 (c)(1),
(2), (4) Date: Aug. 6, 2007

(87) PCT Pub. No.: WO2006/086365

PCT Pub. Date: Aug. 17, 2006

(65) Prior Publication Data

US 2009/0123680 A1    May 14, 2009

Related U.S. Application Data

(60) Provisional application No. 60/650,609, filed on Feb. 7, 2005.

(51) Int. Cl.
*B29D 22/00* (2006.01)
*B29D 23/00* (2006.01)
*B32B 1/08* (2006.01)

(52) U.S. Cl. ............ 428/35.7; 428/36.9; 428/480; 252/184; 252/190; 502/401

(58) Field of Classification Search ............ 252/184, 252/190; 428/35.7, 36.9, 480; 502/401
See application file for complete search history.

(56) References Cited

U.S. PATENT DOCUMENTS

| | | | |
|---|---|---|---|
| 5,441,630 | A | 8/1995 | Dai et al. |
| 5,874,517 | A | 2/1999 | Huang et al. |
| 5,945,460 | A | 8/1999 | Ekart et al. |
| 5,968,429 | A | 10/1999 | Treece et al. |
| 5,980,797 | A | 11/1999 | Shelby et al. |
| 6,274,212 | B1 | 8/2001 | Rule et al. |
| 6,540,936 | B1 * | 4/2003 | Takagi et al. ............ 252/184 |
| 6,569,479 | B2 | 5/2003 | Rule |
| 6,632,874 | B2 | 10/2003 | Rule et al. |
| 6,911,523 | B2 | 6/2005 | Rule |
| 7,498,368 | B2 | 3/2009 | Harashina et al. |
| 2005/0159515 | A1 | 7/2005 | Wiegner et al. |
| 2007/0004832 | A1 | 1/2007 | Prusak |

FOREIGN PATENT DOCUMENTS

WO    2004111131    12/2004
WO    WO2005092983    3/2005

* cited by examiner

*Primary Examiner*—Michael C Miggins
(74) *Attorney, Agent, or Firm*—John H. Hornickel

(57) ABSTRACT

A polymer composition is disclosed for containers for beverages, films and sheets for food. The composition comprises (a) polyester, (b) an acetaldehyde scavenger, (c) an acid absorber, and (d) an antioxidant. The acetaldehyde scavenger is characterized as small molecules, such as anthranilamide, that include at least two hydrogen-substituted heteroatoms bonded to carbons of the organic additive compound such that the organic additive compound is reactive with acetaldehyde in the polyester to form water and a resulting organic compound comprising an unbridged 5- or 6-member ring including the at least two heteroatoms. The acid absorber is a hydrotalcite-like composition. The polymer compound can be concentrated in a masterbatch or fully let-down. Optional ingredients include colorants, and optical brighteners. Discoloration of the polyester is reduced during the performance of acetaldehyde scavenging.

18 Claims, No Drawings

ACETALDEHYDE SCAVENGER IN POLYESTER ARTICLES

CLAIM OF PRIORITY

This application claims priority from U.S. Provisional Patent Application Ser. No. 60/650,609 bearing Attorney Docket Number 12005001 and filed on Feb. 7, 2005.

FIELD OF THE INVENTION

This invention relates to the scavenging of acetaldehyde from articles made from polyesters.

BACKGROUND OF THE INVENTION

Plastic has taken the place of other materials in a variety of industries. In the packaging industry, plastic has replaced glass to minimize breakage, reduce weight, and reduce energy consumed in manufacturing and transport.

Polyethylene terephthalate (PET) is very often used as a plastic for replacement of glass in the packaging industry, particularly the beverage container industry.

U.S. Pat. No. 5,874,517 (Huang et al,) discloses the problems in the art of regenerated acetaldehyde in PET resin and their method for solving that problem.

As described in Huang et al., acetaldehyde is one of several byproducts created during PET polymerization, and remains in the polymer chip after polymerization is completed. Acetaldehyde must be minimized because it can introduce flavor to the drinks contained in the bottles, which is highly undesirable. The acetaldehyde trapped in the chip during the polycondensation reaction to prepare PET, is widely known as "free" acetaldehyde. In addition to free acetaldehyde, acetaldehyde may also be formed by the further reaction or decomposition of PET and other byproducts ("acetaldehyde precursors") trapped in the polymer chip during polymer manufacture. Acetaldehyde produced from the reaction of trapped acetaldehyde precursors or which is formed during degradation occurring during the molding process is referred to as "regenerated" acetaldehyde. Reactions which produce regenerated acetaldehyde are induced when the polymer is subjected to high temperatures, such as those temperatures utilized in the injection molding process.

Huang et al. reports that antioxidants have been widely studied and used for preventing PET thermal and thermal oxidative degradation. But none reported by Huang et al. worked in order to reduce regenerated acetaldehyde while also maintaining color values acceptable for bottle resin.

U.S. Pat. No. 6,569,479 (Rule) discloses an oxidation catalyst active for the oxidation of acetaldehyde to acetic acid to be used in a beverage container.

U.S. Pat. No. 6,632,874 (Rule et al.) discloses decreasing aldehyde content in polyolefin materials by combining with the polyolefin material an organic additive compound which reacts with aldehydes to form water and a resulting organic compound.

U.S. Pat. No. 6,274,212 (Rule et al.) discloses a method for decreasing acetaldehyde content of melt processed polyester comprising combining with melted polyester an organic additive compound which scavenges acetaldehyde from the polyester without imparting discoloration to the polyester. The organic additive compound comprises at least two hydrogen substituted heteroatoms bonded to carbons of the organic additive compound such that the organic additive compound is reactive with acetaldehyde in the polyester to form water and a resulting organic compound comprising an unbridged five or six member ring including the at least two heteroatoms. The reduced acetaldehyde content polyester is particularly useful for making containers such as for packaging beverages.

Despite the statements in U.S. Pat. No. 6,274,212 (Rule et al.) about lack of discoloration, makers of commercial polyester beverage containers have noted yellowing of the container when following the teachings of this patent document.

SUMMARY OF THE INVENTION

What the art needs is an acetaldehyde scavenger formulation that does not discolor the polyester article, particularly those which are beverage containers made partly of scrap polymer, for bottled water, and especially those which contain carbonated bottled water.

The present invention solves this practical problem by unexpectedly combining an acetaldehyde scavenger with an acid absorber and an antioxidant to minimize discoloration of the polyester beverage article.

One aspect of the present invention is a polymer compound, comprising (a) carrier, (b) an acetaldehyde scavenger, (c) an acid absorber, and (d) an antioxidant.

Another aspect of the present invention is the polymer compound in the form of a polymer pre-form, a beverage container, or packaging film and sheet.

Optionally, the polymer compound also contains a blue colorant of either pigment, dye, or both.

Optionally, the polymer compound also contains an optical brightener.

Optionally, the polymer compound can be either in concentrated form (also called a "masterbatch" in solid or liquid form) to serve as an additive to polyester resin at the time of article formation or in unconcentrated or undiluted form (also called fully "let-down") as a compound fully mixed into pellets before melting and formation into an article such as a beverage container or a packaging film and sheet.

Features and advantages of the invention will be discernible from a discussion of the embodiments of the invention.

EMBODIMENTS OF THE INVENTION

Polyester and Other Carriers

As disclosed in U.S. Pat. No. 6,274,212 (Rule et al.), polyesters, especially poly(ethylene terephthalate) (PET), are versatile polymers that enjoy wide applicability as fibers, films, and three-dimensional structures. A particularly important application for PET is for containers, especially for food and beverages. This application has seen enormous growth over the last 25 years, and continues to enjoy increasing popularity. Other polyesters suitable for the present invention include poly(ethylene naphthalate), poly(ethylene adipate), poly(ethylene isophthalate), and blends or copolymers of the same.

Despite this growth, PET has some fundamental limitations that restrict its applicability. One such limitation is its tendency to generate acetaldehyde (AA) when it is melt processed. Because AA is a small molecule, AA generated during melt processing can migrate through the PET. When PET is processed into a container, AA will migrate over time to the interior of the container. Although AA is a naturally occurring flavorant in a number of beverages and food products, for many products, the taste imparted by AA is considered undesirable. For instance, AA will impart a fruity flavor to water, which detracts from the clean taste desired for this product.

PET is traditionally produced by the transesterification or esterification/polymerization of a terephthalate precursor (either dimethyl terephthalate or terephthalic acid) and ethylene glycol. If the end use application for the melt-polymerized PET is for food packaging, the PET is then subject to a second operation known as solid-state polymerization (SSP), whereby the molecular weight is increased and the AA generated during melt processing is removed. A widely used method to convert the SSP PET into containers consists of drying and remelting the PET, injection molding the polymer into a container precursor (pre-forms), and subsequently stretch blow-molding the preform into the final container shape. It is during the remelting of the PET to fashion the container pre-forms that AA is regenerated. Typical pre-form AA levels for PET processed in the most modern injection molding equipment is 6-10 μg/g (ppm).

In the compounds of the present invention, the polyester can be present in an amount to serve as the base resin for the formation of the beverage container, packaging film or packaging sheet or can be present in a reduced amount to serve as the carrier for introduction of a concentrated masterbatch into the base resin.

Alternatively, the carrier can be different than polyester, so long as the carrier composition is compatible with polyester. Non-limiting examples of carriers include polyolefin such polyethylene, waxes such as montan or non polar polyethylene, and liquids such as di-octyl adipate and polyoxyethylene sorbitan monooleate.

Acetaldehyde Scavenger

As disclosed in U.S. Pat. No. 6,274,212 (Rule et al.), the AA scavenger is an organic additive compound that chemically reacts with the AA.

Suitable organic additive compounds effective in the present invention can be characterized as small molecules that include at least two hydrogen-substituted heteroatoms bonded to carbons of the organic additive compound such that the organic additive compound is reactive with acetaldehyde in the polyester to form water and a resulting organic compound comprising an unbridged 5- or 6-member ring including the at least two heteroatoms. Unlike the prior art methods that depend on the formation of inherently colored imines, the formation of unbridged 5 or 6 member ring structures do not inherently result in color formation. In addition, thermodynamics often favor ring formation more than imine formation; thus, significantly lower amounts of the organic additive compound of this invention can effectively decrease the AA content of melt-processed polyesters.

The heteroatoms capable of reacting with AA include oxygen (O), nitrogen (N), and sulfur (S). The heteroatoms of the additive compound should have at least one bond to an active hydrogen (H), and in the course of condensing with AA should split off water. Preferred functional groups containing these heteroatoms include amine ($NH_2$ and NHR), hydroxyl (OH), carboxyl ($CO_2H$), amide ($CONH_2$ and CONHR), sulfonamide ($SO_2NH_2$), and thiol (SH). It is necessary for these functional groups to be sterically arranged, so that on condensation with AA, an unbridged 5 or 6 member ring can be formed. It is preferred that the structural arrangement allows the formation of a six member ring. It is especially preferred that heteroatoms of the organic additive are attached to a preformed ring or rings. It is most preferred that the preformed ring(s) are aromatic so that the unbridged 5 or 6-member ring of the resulting organic compound is bonded to the aromatic ring.

Suitable organic additive compounds are substantially thermally stable at the temperatures required for melt-processing the polyester. It is also preferred that the organic additive compound include functional groups which include the heteroatoms and active hydrogens and are relatively unreactive toward the ester linkages present in polyesters. High thermal stability and low reactivity with ester linkages increase the amount of unreacted organic additive compound that will be available for condensation with AA, thus reducing the amount needed to achieve effective levels of AA scavenging. Compounds with decomposition temperatures >270° C. as measured by Thermal Gravimetric Analysis (TGA) are desirable and compounds with decomposition temperatures >300° C. are most preferred. Compounds that decompose by intramolecular elimination reactions at temperatures less than about 200° C. are least likely to be effective.

Examples of additives that meet the above requirements and are effective at decreasing the AA content of melt-processed polyesters include anthranilamide, salicyclamide, salicylanilide, o-phenylenediamine, 3,4-diaminobenzoic acid, 1,8-diaminonaphthalene, o-mercaptobenzamide, N-acetylglycinamide, malonamide, 3-mercapto-1,2-propanediol, 4-amino-3-hydroxybenzoic acid, 4,5-dihydroxy-2,7-naphthalenedisulfonic acid disodium salt, biuret, 2,3-diaminopyridine, 1,2-30 diaminoanthraquinone, dianilinoethane, allantoin, 2-aminobenzenesulfonamide, and 2-amino-2-methyl-1,3-propanediol. Preferred additives include 1,8-diaminonaphthalene, salicylamide, salicylanilide, allantoin, and anthranilamide. Especially preferred is anthranilamide, also known as amino-2-benzamide, because of its low cost, efficacy, and ease of incorporation into PET.

Other information about the acetaldehyde scavengers useful in the present invention can be found in U.S. Pat. No. 6,274,212 (Rule et al.), including the equation which illustrates how the acetaldehyde scavenger reacts with AA to form water and a resulting compound with an unbridged ring.

The amount of organic additive compound necessary to achieve the desired decrease in AA content is dependent on which specific additive compound is used, and the amount of reduction required. Organic additive compounds which are relatively more effective can achieve greater than 90% reduction in AA content at loadings of between 200 and 500 ppm; additives which are relatively less effective may require addition levels up to 1000 ppm.

Acid Absorber

The acid absorber for the present invention can be a hydrotalcite-like composition. U.S. Pat. No. 5,441,630 (Dai et al.) discloses suitable hydrotalcite-like compositions for use in the present invention. Generally, the hydrotalcite-like composition has the following formula:

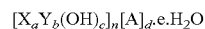

wherein
a=1-10
b=1-10
c=2(a+b)=4-40
A is an anion of formal negative charge n
n=an integer 1-4
d is the formal positive charge of $[X_a Y_b (OH)_c]$
e=1-10
X is a divalent metal
Y is a trivalent metal of Group III or Group VI-B or non-noble Group VIII of the Periodic Table,
subject to the qualification that when one of d or n is an integral multiple of the other, they are both reduced to lowest integral terms.

The metal X may be a Group II-A metal such as beryllium (Be), magnesium (Mg), calcium (Ca), strontium (Sr), barium (Ba), or radium (Ra). The preferred metal is magnesium (Mg). More than one metal X may be present.

The metal Y may be boron (B), aluminum (Al), gallium (Ga), indium (In), or thallium (Tl) of Group III or iron Fe, cobalt Co, or nickel Ni of non-noble Group VIII or chromium Cr, molybdenum Mo, or tungsten W of Group VI-B. The preferred metal is aluminum (Al). More than one metal Y may be present.

a may be 1-10, preferably 3-6.
b may be 1-10, preferably 1-3.
c may be 4-40, preferably 10-16.
n may be an integer 1-4, preferably 1-2.
d may be 1-4, preferably 1.
e may be 1-10, preferably 3-4, say 3.5.

The A anion is selected from $CO_3=$, halogen (e.g., Cl-), acetate $C_2H_3O_2-$, oxalate $HC_2O_4=$, or $C_2O_4=$, $NO_3^-$, $SO_4=$, or $ClO_4^-$. The preferred anion may be $CO_3=$ which has a formal charge of $2^-$.

Non-limiting examples of hydrotalcite-like (HTlc) compositions are listed in Table 1, the first one being preferred and which is available commercially from Kyowa Chemical Industry Co. Ltd. under the designation DHT-4A and bearing CAS. No. 11097-59-9:

TABLE 1

[Mg$_{4.5}$Al$_2$(OH)$_{13}$][CO$_3$]•3.5•H$_2$O
[Mg$_6$Al$_2$(OH)$_{16}$][CO$_3$]•4•H$_2$O
[Mg$_6$Al$_2$(OH)$_{16}$][NO$_3$]•4•H$_2$O
[Ca$_6$Al$_2$(OH)$_{16}$][SO$_4$]•4•H$_2$O
[Zn$_3$Cr(OH)$_8$][NO$_3$]•4•H$_2$O
[Ni$_5$Al$_2$(OH)$_{14}$][NO$_3$]$_2$•4•H$_2$O
[Mg$_4$Fe(OH)$_{10}$][NO$_3$]•4•H$_2$O

Hydrotalcite mineral [Mg.sub.6 Al.sub.2 (OH).sub.16 CO.sub.3.4H.sub.2 O] is a hydroxycarbonate of magnesium and aluminum and occurs naturally in the Urals of the Soviet Union and also in Snarum, Norway. Other information about HTlc compositions can be found in Dai et al.

Alternatively, one can also use calcium stearate or zinc oxide in combination with hydrotalcite-like (HTlc) compositions listed in Table 1.

Antioxidant

The antioxidants for the present invention can be pentaerythritol tetrakis (3(3,5 di-tert-butyl-4-hydroxyphenyl) propionate (commercially available as Irganox 1010 brand stabilizer from Ciba Specialty Chemicals) and those listed in Table 2 by brand name and CAS Number. All of them are commercially available phenolic antioxidants, yet some of them are not yet approved for use with human food.

TABLE 2

| Brand Name of Antioxidant | CAS No. |
|---|---|
| Irganox 1035 | CAS N° 41484-35-9 |
| Irganox 1076 | CAS N° 2082-79-3 |
| Irganox 1081 | CAS N° 90-66-4 |
| Irganox 1098 | CAS N° 23128-74-7 |
| Irganox 1141 | CAS N° 134701-20-5 |
| Irganox 1135 | CAS N° 125643-61-0 |
| Irganox 1222 | CAS N° 976-56-7 |
| Irganox 1330 | CAS N° 1709-70-2 |
| Irganox 1425 | CAS N° 65140-91-2 |
| Irganox 1520 D | CAS N° 110553-27-0 |
| Irganox 3052 FF | CAS N° 61167-58-6 |
| Irganox 3114 | CAS N° 27676-62-6 |
| Irganox 2246 | CAS N° 119-47-1 |
| Irganox 259 | CAS N° 35074-77-2 |
| Irganox 1222 | CAS N° 976-56-7 |
| Irganox 245 | CAS N° 36443-68-2 |
| Santowhite powder | CAS N° 85-60-9 |
| Sumilizer GA 80 | CAS N° 90498-90-1 |
| Topanol CA | CAS N° 1843-03-4 |
| Irganox 3125 | CAS N° 34137-09-2 |
| Irganox 170 | CAS N° 40601-76-1 |
| Irganox 1010 | CAS N° 6683-19-8 |

TABLE 2-continued

| Brand Name of Antioxidant | CAS No. |
|---|---|
| Hostanox 03 | CAS N° 32509-66-3 |
| Wingstay L | CAS N° 31851-03-3 |
| Santonox R | CAS N° 96-69-5 |
| Irganox 565 | CAS N° 991-84-4 |
| Suconox 18 | CAS N° 103-99-1 |
| Tinuvin 144 | CAS N° 63843-89-0 |
| Tinuvin 120 | CAS N° 4221-80-1 |
| Cyasorb UV 2908 | CAS N° 67845-93-6 |
| Eastman Inhibitor RMB | CAS N° 136-36-7 |
| Sumilizer GS | CAS N° 128961-68-2 |
| Irganox HP 136 | CAS N° 181314-48-7 |
| Irgastab FS 042 | CAS N° 143925-92-2 |
| Vulkanox PBN | CAS N° 135-88-6 |
| Flectol H | CAS N° 26780-96-1 |
| Vulkanox 4010 NA | CAS N° 101-72-4 |
| Vulkanox PAN | CAS N° 90-30-2 |
| Irganox 5057 | CAS N° 68411-46-1 |
| Naugard 445 | CAS N° 10081-67-1 |
| Irganox L118 | CAS N° 118832-72-7 |

Optional Colorants

To counteract any possible yellowing effects remaining in the polyester article, such as a beverage container, even with the presence of the acetaldehyde scavenger, the acid absorber and the antioxidant described above, one can also optionally include a small amount of bluish colorant selected from pigments, dyes, or both.

Non-limiting examples of blue colorants are the Macrolex brand of colorants from Lanxess A.G., Heliogen & Sicopal brands of pigments from BASF A.G., and Nubix brands of pigments from Holliday Pigments.

Optional Optical Brighteners

To further counteract any possible yellowing effects, one can also optionally include a small amount of optical brightener.

Non-limiting examples of optical brighteners are the Uvitex brand of brighteners from Ciba Speciality Chemicals and phenylcoumarins such as the Blankophor brand from Lanxess A.G. and the Leukopur brand from Clariant.

Table 3 shows additional chemicals and their CAS Nos. for optical brighteners useful in the present invention.

TABLE 3

| Optical Brighteners | |
|---|---|
| Bis benzoxazoles | CAS N° 1533-45-5, CAS N° 5242-49-9, CAS N° 7128-64-5, and CAS N° 5089-22-5 |
| Pyrene-triazine | CAS N° 3271-22-5 |
| Benzotriazole-coumarin | CAS N° 53850-91-2 |
| Naphtotriazole-coumarin | CAS N° 3333-62-8 |
| Methyl coumarin | CAS N° 91-44-1 |
| Bis-(styryl) bisphenyls | CAS N° 40470-68-6 and CAS N° 27344-41-8 |

Tables 4 and 5 show the levels of acceptable, desirable, and preferable amounts of each of the ingredients in the compound, when in concentrated form to serve as a masterbatch and when serving as the final compound, respectively. In either case, the compound takes the form of pellets to be melted prior to molding into a beverage container or extruding into a packaging film or sheet.

TABLE 4

Masterbatch

| Ingredient | Acceptable Range (Wt. %) | Desirable Range (Wt. %) | Preferable Range (Wt. %) |
|---|---|---|---|
| Carrier (Polyester or Polyolefin or Wax or Liquid) | 20 to 98.80 | 30 to 94 | 40 to 90 |
| Acetaldehyde Scavenger | 1 to 52 | 4 to 45 | 8 to 40 |
| Acid Absorber | 0.10 to 13 | 1 to 12 | 2 to 10 |
| Antioxidant | 0.10 to 13 | 1 to 12 | 2 to 10 |
| Colorant | 0 to 3 | 0 to 2 | 0 to 1 |
| Optical Brightener | 0 to 3 | 0 to 2 | 0 to 1 |

TABLE 5

Final Compound

| Ingredient | Acceptable Range (Wt. %) | Desirable Range (Wt. %) | Preferable Range (Wt. %) |
|---|---|---|---|
| Polyester and Carrier | 95 to 98.50 | 96 to 99 | 98 to 99.99 |
| Acetaldehyde Scavenger | 0.01 to 1 | 0.02 to 0.5 | 0.04 to 0.20 |
| Acid Absorber | 0.005 to 1.5 | 0.008 to 1 | 0.01 to 0.5 |
| Antioxidant | 0.005 to 1.5 | 0.008 to 1 | 0.01 to 0.5 |
| Colorant | 0 to 0.2 | 0 to 0.15 | 0 to 0.1 |
| Optical Brightener | 0 to 0.15 | 0 to 0.1 | 0 to 0.01 |

Methods of Compounding and Forming

Any continuous method of melt-mixing is suitable for compounding the ingredients. A continuous mixer such as an extruder typically operates at a temperature from about 220 to about 300, and preferably from about 235 to about 275° C. and a mixing speed from about 50 to about 1000, and preferably from about 250 to about 500 revolutions per minute.

Molding of compounds of the present invention into beverage containers can use any conventional molding technique known to those in the business of making beverage containers from pre-forms.

Pre-forms are also molded articles that are embryonic, compared with the final shape of the beverage container. A typical pre-form injection molding machine is an Arburg 370 mono-cavity machine which operates at temperatures ranging from about 250 to about 290° C., and preferably from about 270 to about 280° C.

Final beverage container molding uses blow molding machines known to those skilled in that art. Likewise, packaging films are formed via sheet molding machines known to those skilled in the films processing art. The final compounds shown in Table 5 are suitable for both types of machines based on masterbatches shown in Table 4.

Usefulness of the Invention

The composition comprising polyester, acetaldehyde scavenger, and acid absorber, and antioxidant, and optional colorant, or optical brightener is particularly suitable for making containers such as a container for use in packaging beverages, because of the reduced acetaldehyde content without any discernable discoloration. With the reduced acetaldehyde content, the containers impart less of an off taste to the beverages. This is particularly important for beverages, such as water, which do not have a strong flavor.

Other polyester food packaging articles are also candidates for compounds of the present invention. For example, polyester films and sheets used in food packaging also benefit from the non-discoloring AA scavenging compounds of the present invention.

Other embodiments are described in the following examples.

EXAMPLES

Examples 1-5 and Comparative Examples A-E

Table 6 shows the source of ingredients for the Examples and Comparative Examples. Table 7 shows the recipes for concentrate masterbatches. The masterbatches were formed as pellets following melt-mixing in a twin-screw extruder operating at 260° C. and 435 rpm.

TABLE 6

Ingredients and Sources

| Ingredient Name | Commercial Source | Source Location |
|---|---|---|
| PET 9921 | Voridian BV | Rotterdam, Netherlands |
| Anthranilamide AA Scavenger | VWR International | Fontenay sous Bois, France |
| DHT-4A acid absorber | Mitsui & CO France S.A. | Paris, France |
| Irganox 1010 antioxidant | Ciba Specialty Chemicals | Paris, France |
| Macrolex BU RR colorant | Lanxess France. | Puteaux, France |
| Macrolex blue 3R colorant (comparative) | Lanxess France | Puteaux, France |
| Uvitex OB colorant | Ciba Specialty Chemicals | Courbevoie, France |
| Uvinul 2000 AA Scavenger (comparative) | BASF France | Levallois Perrêt, France |

TABLE 7

Masterbatch Recipes (Wt. %)

| Ingredient Name | Comp. A | 1 | 2 | 3 | 4 | Comp. B |
|---|---|---|---|---|---|---|
| PET 9921 | 96 | 94 | 93.9 | 93.998 | 93.99 | 90 |
| Anthranilamide AA Scavenger | 4 | 4 | 4 | 4 | 4 | 0 |
| DHT-4A acid absorber | 0 | 1 | 1 | 1 | 1 | 0 |
| Irganox 1010 antioxidant | 0 | 1 | 1 | 1 | 1 | 0 |
| Macrolex BU RR colorant | 0 | 0 | 0.1 | 0 | 0 | 0 |
| Uvitex OB colorant | 0 | 0 | 0 | 0.002 | 0.01 | 0 |
| Uvinul 2000 AA Scavenger (comparative) | 0 | 0 | 0 | 0 | 0 | 10 |

Table 8 shows the recipes for compounds. The masterbatches were dried overnight in a vacuum oven at 150° C., while virgin polyester resin was dried in a press desiccant drier. Into a vacuum tight container were added the virgin resin and the minor amount of masterbatch. A mixing head was added at the end of the extruder in order to improve dispersion of the additive to the resin, even though using a mixing head was found to slightly increase the starting acetaldehyde content.

TABLE 8

Compound Recipes (Wt. %)

| Ingredient Name | Comp. C (Control) | Comp. D | 5 | Comp. E |
|---|---|---|---|---|
| PET 9921 | 99.999 | 98 | 98 | 97 |
| Masterbatch Comp. A | 0 | 2 | 0 | 0 |
| Masterbatch 1 | 0 | 0 | 2 | 0 |
| Masterbatch Comp. B | 0 | 0 | 0 | 3 |
| Macrolex blue 3R colorant | 0.001 | 0.001 | 0.001 | 0.001 |

The compounds were injection molded into pre-forms in an Arburg mono-cavity machine using conventional settings and measured for AA content and color.

To measure AA content, pre-forms were ground to very fine particles in order to fully extract AA. Then, the particles were analyzed with a GC (Gas Chromatograph 3800 Varian type), by which gases were separated from the substrates. A linear calibration of the equipment was done with 8 different points and so used as a reference. A sensor then analyzed a combination of gases+vector gas such as H or $N^2$. The concentration of AA was determined from this measurement. Compared with Comparison Example C, Comparison Example D had a reduction in AA content of 72% while Example 5 had a reduction of 80%. But Comparison Example D was pale yellow in color compared to Example 5.

The compounds of Table 8 were also evaluated for quantitative color measurements using the CieLab system under D65 illuminant at 10° in transmission. The measurements were conducted after one pass on plaques that were injection molded under conventional conditions and after five passes, in order to account for reprocessing of scrap. The plaques were approximately 3-4 times as thick as a beverage container; therefore, a proportionally lower concentration of colorant was used. The injection temperature was 270° C. Comparative Example C acetaldehyde content and color. Table 9 shows the results of quantitative color analysis, evidence of the unexpected advantage of adding acid absorber and antioxidant to an otherwise conventional acetaldehyde scavenging composition taught by the prior art and attempted in commerce.

TABLE 9

Quantitative Color Measurements

| Example | Absolute value L* | Absolute value a* | Absolute value b* |
|---|---|---|---|
| Comparative Example C Color Control Simulating a Light Blue Bottled Water beverage container | 72.91 | −2.47 | −3.19 |

| | Delta L* | Delta a* | Delta b* |
|---|---|---|---|
| Comparative Example E | −0.48 | −1.00 | +7.80 |
| Comparative Example D | After 1 pass: −0.04 After 5 passes: −0.39 | After 1 pass: −0.38 After 5 passes: −0.44 | After 1 pass: +1.54 After 5 passes: +2.22 |
| Example 5 | After 1 pass: +0.09 After 5 passes: −0.58 | After 1 pass: −0.24 After 5 passes: −0.73 | After 1 pass: +1.21 After 5 passes: +1.20 |

Delta L* with a positive number indicates better clarity on the black/white axis. Delta a* with a negative number indicates more green on the red/green axis. Delta b* with a positive number indicates more yellow on the yellow/blue axis.

For the example of a light blue beverage container, therefore, the b* axis is more critical. Reviewing the Delta b* results, one finds that Comparative Example E gave a dirty greenish color; Comparative Example D gives a dirty blue color; and Example 5 gives a blue color that is closer to the color control of Comparative Example C than either Comparative Example E or Comparative Example D. Moreover, the color results actually and unexpectedly improve with the additional passes, indicating robust retention of non-discoloration in recycled or reprocessed polyesters, a considerable advantage in environmentally waste sensitive societies.

To achieve an even closer color match to the color control of Comparative Example C, it has been confirmed that one can use a masterbatch of Example 2 instead of the masterbatch of Example 1 when formulating Example 5.

The invention is not limited to the above embodiments. The claims follow.

What is claimed is:

1. A polymer compound, comprising:
   (a) carrier
   (b) an acetaldehyde scavenger,
   (c) an acid absorber, and
   (d) an antioxidant.

2. The compound of claim 1, wherein the antioxidant is a phenolic antioxidant.

3. The compound of claim 1, further comprising (e) a blue colorant.

4. The compound of claim 1, further comprising (f) an optical brightener.

5. The compound of claim 1, wherein
   the carrier is present in an amount ranging from about 20 to about 98 weight percent;
   the acetaldehyde scavenger is present in an amount ranging from about 1 to about 52 weight percent;
   the acid absorber is present in an amount ranging from about 0.1 to about 13 weight percent, and
   the antioxidant is present in amount ranging from about 0.1 to about 13 weight percent,
   wherein all weight percents are to the total weight of the compound, and wherein the compound is a masterbatch.

6. The compound of claim 1, wherein
   the carrier includes polyester and is present in an amount ranging from about 95 to about 98 weight percent;
   the acetaldehyde scavenger is present in an amount ranging from about 0.01 to about 1 weight percent;
   the acid absorber is present in an amount ranging from about 0.005 to about 1.5 weight percent, and
   the antioxidant is present in amount ranging from about 0.005 to about 1.5 weight percent,
   wherein all weight percents are to the total weight of the compound, and wherein the compound is a let-down compound suitable for molding or extruding into a polymer article.

7. An article made from a compound of claim 1, wherein the article is selected from the group consisting of a polymeric pre-form, a beverage container, a film, and a sheet.

8. The article of claim 7, wherein the article is a beverage container.

9. The article of claim 7 wherein the article is a polymeric pre-form.

10. The article of claim 7, wherein the antioxidant in the compound is a phenolic antioxidant.

11. The article of claim 7, wherein the compound further comprises (e) a blue colorant.

12. The article of claim 7, wherein the compound further comprises (f) an optical brightener.

13. The article of claim 7, wherein, in the compound,
the carrier includes polyester and is present in an amount ranging from about 95 to about 98 weight percent;
the acetaldehyde scavenger is present in an amount ranging from about 0.01 to about 1 weight percent;
the acid absorber is present in an amount ranging from about 0.005 to about 1.5 weight percent, and
the antioxidant is present in amount ranging from about 0.005 to about 1.5 weight percent,
wherein all weight percents are to the total weight of the compound.

14. A method for scavenging acetaldehyde from polyester while minimizing discoloration of the polyester, comprising forming an article using a compound of claim 1.

15. The method of claim 14, wherein the antioxidant in the compound is a phenolic antioxidant.

16. The method of claim 14, wherein the compound further comprises (e) a blue colorant.

17. The method of claim 14, wherein the compound further comprises (f) an optical brightener.

18. The method of claim 14, wherein, in the compound,
the carrier includes polyester and is present in an amount ranging from about 95 to about 98 weight percent;
the acetaldehyde scavenger is present in an amount ranging from about 0.01 to about 1 weight percent;
the acid absorber is present in an amount ranging from about 0.005 to about 1.5 weight percent, and
the antioxidant is present in amount ranging from about 0.005 to about 1.5 weight percent,
wherein all weight percents are to the total weight of the compound.

* * * * *